United States Patent [19]

Rhudy et al.

[11] 3,858,652

[45] Jan. 7, 1975

[54] MOBILITY CONTROL IN LOW PERMEABILITY RESERVOIRS

[75] Inventors: John S. Rhudy; Bruce L. Knight, both of Littleton, Colo.

[73] Assignee: Marathon Oil Company, Findlay, Ohio

[22] Filed: May 14, 1973

[21] Appl. No.: 359,939

[52] U.S. Cl. .................................. 166/274, 166/273
[51] Int. Cl. ............................................ E21b 43/22
[58] Field of Search ............ 166/273, 274, 275, 261, 166/270, 271, 269; 252/8.55 D

[56] References Cited
UNITED STATES PATENTS 3,613,786  10/1971  Jones et al. .......................... 166/273
3,679,000  7/1972  Kaufman ............................. 166/273

Primary Examiner—Stephen J. Novosad
Attorney, Agent, or Firm—Joseph C. Herring; Richard C. Willson, Jr.; Jack L. Hummel

[57] ABSTRACT

Improved oil recovery from reservoirs having average permeabilities less than 100 md is obtained by injecting into and displacing through the reservoir an aqueous mobility buffer containing an N-sulfohydrocarbon-substituted acrylamide polymer. A micellar solution slug is preferably injected ahead of the buffer slug. This polymer has a reasonably high intrinsic viscosity and permits high injection rates. "Plugging" of the reservoir is minimal at worst.

15 Claims, No Drawings

MOBILITY CONTROL IN LOW PERMEABILITY RESERVOIRS

BACKGROUND OF THE INVENTION

1. Field of the Invention

This invention relates to injecting fluids, at least two separate slugs, through an injection means into a subterranean reservoir and displacing them toward a production means to recover crude oil therethrough.

2. Description of the Prior Art

High molecular weight polymers are known to effect mobility control by increasing the viscosity of the water and/or reducing the permeability of the reservoir rock by sorption on the rock surface, bridging pores within the rock, etc. According to the art, both viscosity and permeability reduction increase as the molecular weight of acrylamide-type polymers increases. Any substantial reduction of permeability in reservoirs of less than 100 md decreases the rate at which fluids can be injected to the point where the flooding process may become uneconomic.

Biopolymers (See U.S. Pat. No. 3,305,016 to Lindlblom et al.) increase the viscosity of the aqueous medium, but cause little permeability reduction. However, the amounts of polymer required, handling problems and unit cost have resulted in limited application of these polymers. A number of patents teaching the use of these polymers in oil recovery are:

U.S. Pat. Nos. 2,827,964 to Sandiford and 3,039,529 to McKennon teach the use of partially hydrolyzed, high molecular weight polyacrylamides. These polymers increase the viscosity of the flooding medium, but reduce the permeability of the reservoir. U.S. Pat. No. 2,341,500 to Detling teaches the use of water-soluble synthetic polymers. U.S. Pat. No. 2,842,492 to Engelhardt et al. uses ethylenically unsaturated carboxylic acids and ethylenically unsaturated noncarboxylic acid copolymers. U.S. Pat. No. 3,002,960 to Kolodny uses copolymers of acrylamide and acrylic acid; U.S. Pat. Nos. 3,025,237 and 3,070,158 to Roper teach the use of copolymers of acrylamide/acrylic acid and U.S. Pat. Nos. 2,771,138 to Beeson, 3,020,953 to Zerweck et al., 3,370,649 to Wolgemuth, and 3,399,725 to Pye teach still additional polymers.

SUMMARY OF THE INVENTION

This invention relates to the use of N-sulfohydrocarbon substituted acrylamide polymers to form aqueous solutions useful in reservoirs having permeabilities below about 100 md. and preferably less than 75 md. The N-sulfo-hydrocarbon substituted acrylamide polymers are described in U.S. Pat. No. 3,697,000 to Kaufman. In the preferred flooding process, a miscible-like displacing agent is injected prior to injection of the polymer solution and a water drive is used to displace both previously injected slugs through the reservoir. Substantially less permeability reduction occurs through use of the identified polymers than through the use of the partially hydrolyzed, high molecular weight polyacrylamides of the prior art, while exceptionally high effective viscosities are effected during flow through the reservoir.

DESCRIPTION OF THE PREFERRED EMBODIMENTS

Where a miscible or miscible-like displacing slug precedes the aqueous polymer solution, it is desired that the slug be an oil-external or water-external emulsion, oil-external or water-external micellar dispersion (this term includes micellar solutions, microemulsions, "transparent" emulsions, hydrous soluble oils, etc., anhydrous soluble oils, hydrocarbon or aqueous fluid containing surfactant(s), cosurfactant(s), electrolyte(s), and like materials), Examples of patents which teach useful displacement agents include U.S. Pat. Nos. 3,254,714 to Gogarty et al.; 3,275,075 to Gogarty et al.; 3,506,070 and 3,706,071 to Jones; 3,497,006 to Jones et al.; 3,330,344 and 3,348,611 to Reisberg; 3,373,809 to Cooke, Jr.; 3,149,669 to Binder, Jr. et al.; 3,126,952 to Jones; 3,082,822 to Holm et al.; 3,163,214 to Csaszar; 3,208,515 to Meadors; 3,208,517 to Binder, Jr. et al.; 3,354,953 to Morse; 3,512,586 and 3,697,424 and 3,500,919 to Holm, etc. The preferred displacing agent is an oil- or water-external micellar dispersion containing, e.g., about 1–70 percent hydrocarbon, about 5–90 percent water, about 2.5 – 20 percent surfactant (preferably a petroleum sulfonate containing a monovalent cation or ammonium and having an average equivalent weight within the range of about 350–525, and optionally about 0.01 – 20 percent cosurfactant (preferably an organic compound containing one to about 20 carbon atoms and containing 1 or more of hydroxy, oxy, epoxy, chloro, amino, or like functional groups), and/or 0.001 – 5 percent, based on the water, of an electrolyte (e.g., inorganic salt, inorganic base, inorganic acid or mixture thereof).

The polymer useful with this invention is a water-soluble N-sulfohydrocarbon-substituted acrylamide polymer, also referred to herein as a sulfoacrylamide polymer. The polymer can be a homopolymer, copolymer, terpolymer, etc., containing at least 5 percent and preferably at least about 50 percent and more preferably at least about 80% and more preferably about 100 percent by weight of repeating units of the formula:

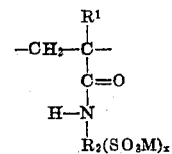

where $R^1$ is hydrogen or a lower alkyl (e.g., contains 1 to about 12 carbon atoms) or substituted lower alkyl radical, $R^2$ is a hydrocarbon or substituted hydrocarbon radical containing about one to about 24 carbon atoms, M is hydrogen or one equivalent of a cation, and $x$ is 1 or 2. $R^1$ is preferably hydrogen or methyl and $R^2$ is preferably alkylene or arylene radical. The term "hydrocarbon radical" is broadly defined to include aliphatic and aromatic radicals and aliphatic and/or aromatic substituted materials thereof. Of course, the lower alkyl and substituted material thereof, the hydrocarbon or substituted hydrocarbon radical and M, collectively present in the repeating unit, must be of sufficient character to obtain a water soluble polymer. Examples of these polymers are those obtained by polymerizing, either alone or in combination with other polymerizable monomers, one or more of the following: -Acrylamidoethanesulfonic -Acryamidoethanesulfone acid, 2-Acrylamidopropanesulfonic acid, 2-Acrylamido-2-methylpropanesulfonic acid, 3-Methacrylamidopropane-sulfonic acid, 4-

Methacrylamidocyclohexanesulfonic acid, 2-Acrylamido-2-phenylethanesulfonic acid, 2-Acrylamido-2-phenyl-propanesulfonic acid, 4-Acrylamidobenzenesulfonic acid, and 5-Acrylamidobenzene-1,3-disulfonic acid and other like N-sulfohydrocarbon-substituted acrylamides. Molecular weights of the polymers should be greater than about 500,000 and can be as high as 20,000,000 or more; however, molecular weights of about 1,000,000 to about 10,000,000 are preferred when flooding reservoirs having average permeabilities of about 100 md. The preferred polymers are those containing at least 50 percent and up to 100 percent of the N-sulfohydrocarbon-substituted acrylamide units previously described and one or more monomers such as acrylamide, methacrylamide, N-methylacrylamide, acrylic acid, methacrylic acid, or salt thereof. Most preferably, the polymer is a homopolymer of the previously described acrylamide unit.

The concentration of polymer in water solution should be about 50 to about 2,000 and preferably about 100 to about 1,500 and more preferably about 200 to about 1,000 ppm. About 5 to 150 percent and preferably about 10 to about 100 percent and more preferably about 20 to about 70 percent formation pore volume of the aqueous polymer solution is useful to impart desired mobility control to the flooding process.

The water used to make up the solution is preferably relatively fresh, that is, it contains less than about 1,000 ppm TDS (total dissolved solids) and more preferably less than about 500 ppm TDS. Of course, higher TDS concentrations may be used if the process and aqueous polymer solution permit such high concentrations—usually the higher concentrations of salts adversely influence mobility control and require higher concentrations of polymer.

Desired properties can be obtained with additives, e.g., bactericides, corrosion inhibitors, oxygen scavenging agents, surfactants, de-emulsifiers, etc. may be added. A drive water is usually injected behind the aqueous polymer solution to displace it toward a production means through which crude oil is recovered. Any drive fluid is useful as long as it is compatible with the aqueous polymer solution and the process.

The following examples are presented to teach specific working embodiments of the invention. Unless otherwise specified, all percents are based on weight.

EXAMPLE 1

Bradford third sandstone cores 1.5 inches long and 1 inch in diameter are cleaned with a solvent and are thereafter dried in a vacuum. The permeabilities of the cores are indicated in Table I. The cores are flooded with 10 pore volumes of an aqueous polymer solution containing 500 ppm of the indicated polymer in water containing 400 ppm TDS. The data illustrated in Table I are obtained over the total core after 10 pore volumes of the aqueous polymer solution are injected at a constant pressure:

TABLE I

CORE FLOOD RESULTS

| Polymer | Initial Perm. (md) | Reciprocal Mobility (cp) | Flushed Perm. (md) | Permeability Reduction | Effective Viscosity (cp) | Frontal Velocity (ft/day) |
| --- | --- | --- | --- | --- | --- | --- |
| N-sulfohydrocarbon-substituted acrylamide polymer | 50 | 102 | 2.5 | 20 | 5.0 | 3.9 |
| Partially hydrolyzed high molecular wgt polyacrylamide | 78 | 35 | 3.8 | 21 | 1.7 | 4.1 |

The sulfocrylamide polymer has an intrinsic viscosity of 13.4 deciliters/gram and the intrinsic viscosity of the partially hydrolyzed polyacrylamide (commercially available from Dow Chemical Co., Midland, Michigan) is 12.7, measured in 3% NaCl solution. The above data indicates that the sulfoacrylamide polymer reduces the permeability of the rock to a permissible level; the effective viscosity of the polymer solution is three times greater than the partially hydrolyzed polyacrylamide solution. The reciprocal mobility, dependent on resistance to flow (i.e., permeability reduction and viscosity) divided by the flow rate, of the sulfoacrylamide polymer substantially stabilized whereas the reciprocal mobility of the partially hydrolyzed polyacrylamide solution was gradually increasing throughout the flood—this indicates that more of the polyacrylamide is being retained in the rock than the sulfoacrylamide polymer. The reciprocal mobility of the sulfoacrylamide is about three times greater than that of the partially hydrolyzed polyacrylamide which indicates that polymer concentration required for mobility control would be much lower than that of the partially hydrolyzed polyacrylamide.

EXAMPLE 2

Cleaned sandstone cores about 1.5 inches long 1 inch in diameter were flooded at a constant rate of about 4 ft/day. The 60 md cores are flooded with either 500 ppm of the sulfoacrylamide polymer or 1,000 ppm of a partially hydrolyzed polyacrylamide (commercially available from Dow Chemical Co.) in water containing 400 ppm TDS. Flooding results illustrated in Table 2 are obtained over the total core after 10 pore volumes are injected at constant rate.

TABLE II

CORE FLOOD RESULTS

| Polymer | Initial Permeability (md) | Reciprocal Mobility (cp) | Flushed Permeability (md) | Permeability Reduction | Effective Viscosity (cp) |
|---|---|---|---|---|---|
| 500 ppm sulfoacrylamide polymer | 59 | 89 | 3.3 | 18 | 4.6 |
| 1000 ppm partially hydrolyzed polyacrylamide polymer | 61 | 91 | 1.8 | 34 | 2.7 |

Both polymers impart nearly the same reciprocal mobility, but the sulfoacrylamide polymer requires only one-half the concentration of the partially hydrolyzed polyacrylamide to obtain the same level of mobility control. However, injectivity of drive water after injection of the sulfoacrylamide polymer is nearly twice as high as the injectivity of drive water after injection of the polyacrylamide polymer. Injectivity of drive water proportionally increases as flushed permeability increases (or permeability reduction decreases).

EXAMPLE 3

A substerranean reservoir having an average permeability of about 75 md and having an injection well in fluid communication with a production well is flooded by first injecting about 7 percent formation pore volume of an oil-external micellar dispersion. Then, there is injected 50% formation pore volume of a relatively fresh water containing about 250 ppm in the first 10 percent formation pore volume and 100 ppm of the polymer in the last 40 percent formation pore volume; the polymer is identical to that defined in Example 1. Thereafter a water drive is injected to displace the micellar dispersion and the aqueous polymer solution toward the production well. Mobility control is effective and crude oil is recovered at the production well.

It is not intended that this invention be limited by the specifics taught herein rather, all equivalents obvious to those skilled in the art are to be incorporated within the scope of the invention as defined within the specification and appended claims.

What is claimed is:

1. In a process of recovering hydrocarbon from a hydrocarbon-containing substerranean reservoir having an average permeability less than about 75 md and having an injection means in fluid communication with a production means and wherein an aqueous polymer solution is injected to recover hydrocarbon therethrough, the improvement comprising using as the aqueous polymer solution a solution comprised of a polymer containing at least 5 percent by weight of repeating units of the formula:

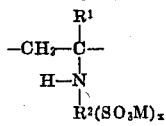

wherein $R^1$ is hydrogen or a lower alkyl or substituted lower alkyl radical, $R^2$ is a hydrocarbon or substituted hydrocarbon radical, M ia hydrogen or one equivalent of a cation, and $x$ is 1 or 2.

2. The process of claim 1 wherein the concentration of the polymer within the aqueous solution is about 50 to about 2,000 ppm.

3. The process of claim 1 wherein a miscible or miscible-like fluid is injected previous to the injection of the aqueous polymer solution.

4. The process of claim 1 wherein the average permeability of the reservoir is less than about 50 md.

5. The process of claim 1 wherein a micellar dispersion is injected previous to the injection of the aqueous polymer solution.

6. The process of claim 1 wherein about 5 to about 150 percent formation pore volume of aqueous polymer solution is injected into the reservoir.

7. The process of claim 1 wherein the polymer contains at least about 50 percent by weight of the repeating units.

8. The process of claim 1 wherein the polymer contains at least about 80 percent by weight of the repeating units.

9. The process of claim 1 wherein the polymer contains about 100 percent by weight of the repeating units.

10. In a process of flooding a hydrocarbon-containing subterranean reservoir having an average permeability less than about 75 md and having an injection means in fluid communication with a production means and wherein a miscellar dispersion and an aqueous polymer solution are injected therein and displaced toward the production means to recover crude oil therethrough, the improvement comprising injecting about 5 to about 15 percent formation pore volume of an aqueous polymer solution containing about 50 to about 2,000 ppm of a polymer containing at least 5 percent by weight of repeating units of the formula:

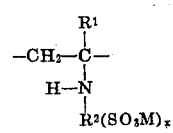

wherein $R^1$ is hydrogen or a lower alkyl or substituted lower alkyl radical, $R^2$ is a hydrocarbon or substituted hydrocarbon radical, M is hydrogen or one equivalent of a cation, and $x$ is 1 or 2.

11. The process of claim 10 wherein about 1 to 50 percent formation pore volume of an oil-external micellar dispersion is injected.

12. The process of claim 10 wherein R² is a lower alkylene or arylene radical and $x$ is 1.

13. The process of claim 10 wherein the polymer is a copolymer with 5–30 percent by weight of acrylic or methacrylic acid or salt or amide thereof.

14. The process of claim 10 wherein the polymer contains at least 50 percent by weight of the repeating units.

15. The process of claim 10 wherein the polymer contains 100 percent by weight of the repeating units.

* * * * *

UNITED STATES PATENT OFFICE
CERTIFICATE OF CORRECTION

Patent No. 3,858,652　　　　　　　Dated　January 7, 1975

Inventor(s)　John S. Rhudy et al

It is certified that error appears in the above-identified patent and that said Letters Patent are hereby corrected as shown below:

| | |
|---|---|
| Col. 1, lines 22 and 23 | Delete "Lindlblom" and insert --Lindblom--. |
| Col. 2, line 10: | Delete "3,706,071" and insert --3,506,071--. |
| Col. 2, line 37: | Delete "more" and insert --most--. |
| Col. 2, line 65: | Delete "-Acrylamidoethanesulfonic" and insert --2-Acrylamidoethanesulfonic acid--. |
| Col. 2, lines 65-66: | Delete "Acryamidoethanesulfone acid" |
| Col. 4, line 32: | Delete "sulfocrylamide" and insert --sulfoacrylamide--. |
| Col. 5, line 28: | Delete "substerranean" and insert --subterranean--. |
| Col. 5, line 50: | Delete "substerranean" and insert --subterranean--. |
| Col. 5, line 67: | Delete "ia" and insert --is--. |
| Col. 6, line 46: | Delete "Miscellar" and insert --micellar--. |
| Col. 6, line 51: | Delete "15" and insert --150--. |
| Col. 6, line 66: | Delete second "about". |

Signed and sealed this 8th day of April 1975.

(SEAL)
Attest:

RUTH C. MASON
Attesting Officer

C. MARSHALL DANN
Commissioner of Patents
and Trademarks